(12) United States Patent
Liang et al.

(10) Patent No.: US 12,094,202 B2
(45) Date of Patent: Sep. 17, 2024

(54) DEVICE, METHOD AND SYSTEM FOR PRUNING VIDEO ANALYTICS PARAMETERS

(71) Applicant: MOTOROLA SOLUTIONS, INC., Chicago, IL (US)

(72) Inventors: Qifan Liang, Chicago, IL (US); Peter L. Venetianer, Chicago, IL (US); Ryan Lee, Vancouver (CA); Thomas Christopher Hansen, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 585 days.

(21) Appl. No.: 17/224,780

(22) Filed: Apr. 7, 2021

(65) Prior Publication Data
US 2022/0327314 A1     Oct. 13, 2022

(51) Int. Cl.
*G06V 20/40* (2022.01)
*G06F 18/21* (2023.01)
*G06N 20/00* (2019.01)
*G06V 20/52* (2022.01)

(52) U.S. Cl.
CPC .......... *G06V 20/40* (2022.01); *G06F 18/2178* (2023.01); *G06N 20/00* (2019.01); *G06V 20/52* (2022.01)

(58) Field of Classification Search
None
See application file for complete search history.

(56) References Cited

U.S. PATENT DOCUMENTS

| | | |
|---|---|---|
| 5,014,219 A | 5/1991 | White |
| 2018/0336468 A1 | 11/2018 | Kadav et al. |
| 2020/0342324 A1 | 10/2020 | Sivaraman et al. |
| 2021/0227271 A1* | 7/2021 | Cox ............... H04N 21/234318 |
| 2022/0292360 A1* | 9/2022 | Shen ..................... G06N 3/045 |
| 2022/0337902 A1* | 10/2022 | Tian ................. H04N 21/44008 |

OTHER PUBLICATIONS

Anwar, Sajid, et al., "Structured Pruning of Deep Convolutional Neural Networks", https://arxiv.org/abs/1512.08571, Dec. 29, 2015.

(Continued)

*Primary Examiner* — Vikkram Bali
(74) *Attorney, Agent, or Firm* — PERRY + CURRIER, INC.

(57) ABSTRACT

A device, method and system for pruning video analytics parameters is provided. A device analyzes images from a camera installed at an installation location using a full initial machine learning model trained to detect objects in the images using video analytics parameters, the full initial machine learning model being independent of the installation location. The device gathers, for a period of time, statistics for: frequency of use of the video analytics parameters and/or error generation frequency in detecting the objects in the images. After the period of time, based on the statistics, the device determines that given video analytics parameters meets one or more pruning conditions; and, in response, prunes the given video analytics parameters such that the full initial machine learning model, initially provided for the camera, changes to an updated machine learning model for the camera.

20 Claims, 6 Drawing Sheets

(56) References Cited

OTHER PUBLICATIONS

Guo, Jia, et al., "Pruning ConvNets Online for Efficient Specialist Models", 2017 IEEE Computer Scolety, Conference on Computer Vision and Pattern Recognition Workshops, pp. 430-437. Jul. 21, 2017.

Li, Hao, et al., "Pruning Filters for Efficient ConvNets", ICLR 2017, Mar. 10, 2017, pp. 1-13.

Madaan, Divyam, et al., "Adversarial Neural Pruning with Latent Vulnerability Suppression", Proceedings of the 37th International Conference on Machine Learning, Vienna, Austria, PMLR 119, Jul. 13, 2020.

Mallya, Arun, et al., "Piggyback: Adapting a Single Network to Multiple Tasks by Learning to Mask Weights", Proceedings of the European Conference on computer Vision (ECCV), pp. 67-82, Mar. 16, 2018.

Molchanov, Pavio, et al., "Pruning Convolutional Neural Networks for Resource Efficient Inference", https://arxiv.org/abs/1611.06440, Jun. 8, 2017.

* cited by examiner

DEVICE, METHOD AND SYSTEM FOR PRUNING VIDEO ANALYTICS PARAMETERS

BACKGROUND OF THE INVENTION

Video analytics for a camera at an installation location may be out-of-the-box and/or turnkey, and the like and hence are generally configured to handle a large number of scenarios independent of the installation location of the camera.

BRIEF DESCRIPTION OF THE SEVERAL VIEWS OF THE DRAWINGS

The accompanying figures, where like reference numerals refer to identical or functionally similar components throughout the separate views, together with the detailed description below, are incorporated in and form part of the specification, and serve to further illustrate embodiments of concepts that include the claimed invention, and explain various principles and advantages of those embodiments.

Figure 1:
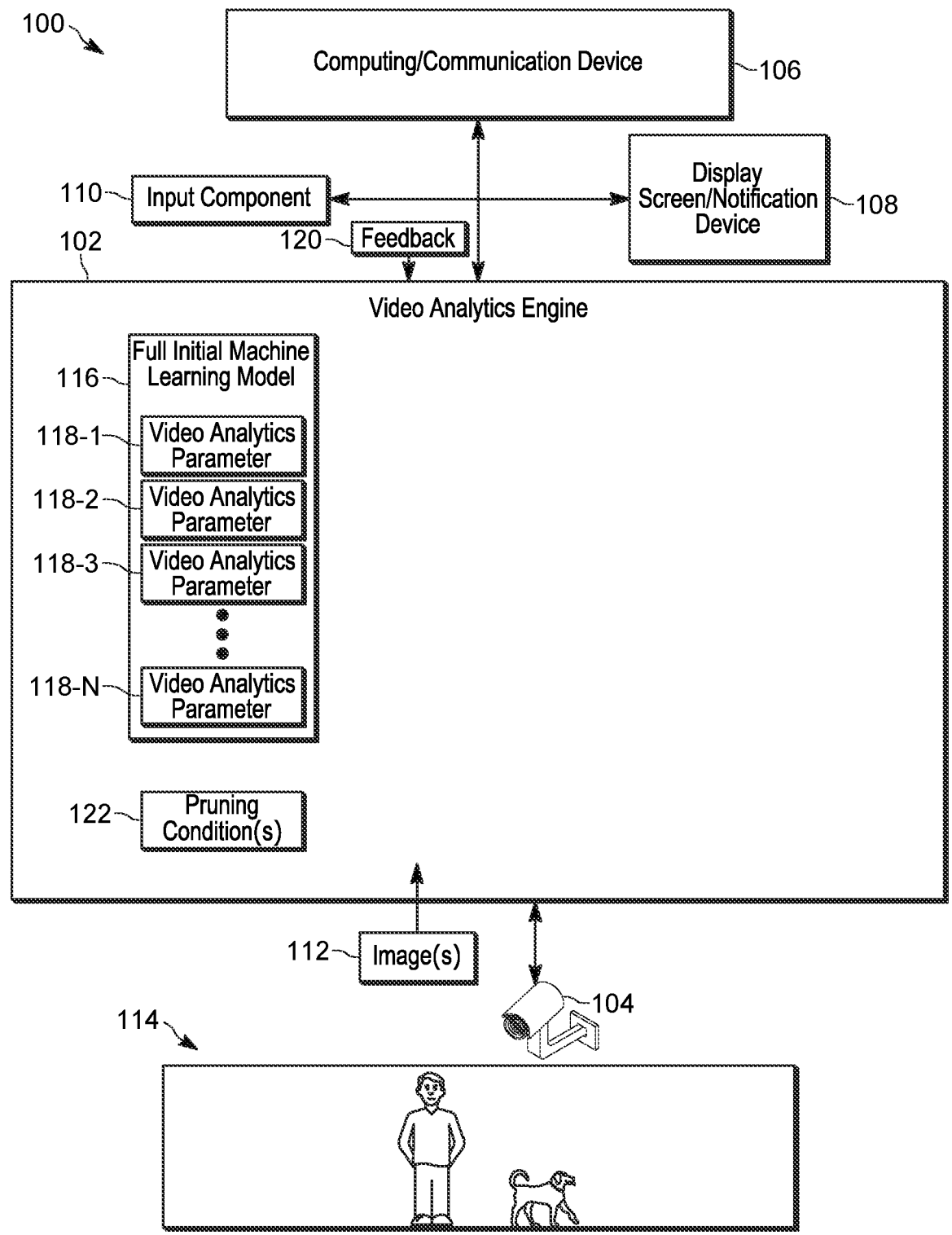
FIG. 1 is a system for pruning video analytics parameters, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Video analytics for a camera at an installation location may be out-of-the-box and/or turnkey, and the like and hence are generally configured to handle a large number of scenarios independent of the installation location of the camera. While a camera may be shipped with site (e.g. location) specific video analytics parameters, such a strategy requires different version types of video analytics which may be complex to manage. Similarly, while updates to the video analytics may occur over a network, such updates may again not be specific enough for the installation location, and/or a central server that handles the updates may need to track a type of location where the camera is installed to provide location specific updates. Thus, there exists a need for an improved technical method, device, and system for pruning video analytics parameters, for example specific to a particular installation location of a camera.

Hence, provided herein is a device, such as a video analytics engine, which analyzes images from a camera using an initial machine learning model trained to detect objects using video analytics parameters which are independent of an installation location of the camera. For example, the camera may be installed at an indoor location and video analytics parameters may be included for detecting humans as well as vehicles. As vehicles are unlikely to be indoors, the video analytics engine may waste processing resources analyzing the images for vehicles using the corresponding video analytics parameters.

As such, the video analytics engine, for a period of time, gathers statistics indicating frequency of use of the video analytics parameters and/or error generation frequency in detecting objects in the images using the video analytics parameters (e.g. which may be based on teach-by-example feedback, as described in more detail below). After the period of time, and based on the statistics, the video analytics engine prunes video analytics parameters which meet given pruning conditions such that the full initial machine learning model changes to an updated machine learning model for the camera. In one example related to frequency of use of video analytics parameters, the one or more pruning conditions may include a respective frequency of use of a video analytics parameter being below a threshold frequency of use. In another example related to error generation frequency, the one or more pruning conditions may comprise a number of errors generated by a video analytics parameter being above a threshold number of errors. As such, video analytics parameters which are not used frequently and/or which lead to error generation may be pruned. Pruning may include deleting video analytics parameters from a memory and/or preventing a video analytics engine from analyzing images using video analytics parameters. Regardless, such pruning may generally cause the video analytics engine to operate more efficiently as the number of video analytics parameters used to analyze the images by the video analytics engine is reduced.

In particular, pruning may be used to generally improve systems that include video analytics engines, and the like, for example by pruning out video analytics parameters that result in errors and/or by updating a full initial machine learning model to a smaller, hence faster, machine learning model. A faster, updated machine learning model may result in video being acquired, and analyzed by the updated machine learning model, at higher framerates and/or higher resolution (as compared to when video is acquired, and analyzed by the full initial machine learning model), both of which can improve performance of systems that include video analytics engines. Furthermore, a faster updated machine learning model may also allow for adding more analytics to the updated machine learning model (e.g. adding more video analytics parameters that are more pertinent to the video being acquired). Furthermore, when a faster updated machine learning model is implemented in a cloud-based environment, the faster updated machine learning model may cost less to operate than slower full initial machine learning model as processing cycles (e.g. and their associated cost) may be reduced, and/or more streams of video may be provided to the updated machine learning model at the cloud-based environment at a similar cost (e.g.

processing cycles) as when the faster updated machine learning model was used to analyze fewer streams of video.

In some examples, either alternatively, or in addition to, gathering statistics, video analytics parameters may be pruned at the video analytics engine by providing, to the video analytics engine, indications of classes of the video analytics parameters which may be pruned, and/or determining, at the video analytics engine, indications of classes of the video analytics parameters which may be pruned. For example, one class of video analytics parameters may be for indoor video analytics parameters, and another class of video analytics parameters may be for outdoor video analytics parameters An indication to prune outdoor (or indoor) video analytics parameters may be provided via an input to the video analytics engine. Alternatively, and/or in addition, the video analytics engine may determine whether or not outdoor video analytics parameters are used, and/or the video analytics engine may determine whether an installation location is indoors or outdoors based on images from the camera; regardless, the video analytics engine may prune video analytics parameters accordingly. For example, when outdoor video analytics parameters are not used, they may be pruned and/or when an installation location is determined to be indoors, the outdoor video analytics parameters may be pruned.

In other examples, a selection of a class, and the like, of video analytics parameters may be provided to the video analytics engine via an input (e.g. such as a selection of outdoor (or indoor) video parameters). The selection is indicative of video analytics parameters which may be pruned and/or may not be relevant to an installation location of the camera. The video analytics engine may continue to use the selected video analytics parameters to detect (e.g. and the like) associated objects, but no reporting of the associated objects may occur (e.g. no alerts are generated). The video analytics engine may thereafter gather statistics on the video analytics parameters (e.g. whether selected or not) for a period of time. After the given time period, the video analytics parameters that are used primarily only when the selected video analytics parameters are used may be pruned Such video analytics parameters that are pruned may include the selected video analytics parameters, but may also include other video analytics parameters that are not selected, but primarily used only in conjunction with the selected video analytics parameters. Put another way, when a first selected video analytics parameter is used, and a second not selected video analytics parameter is used in association with the first selected video analytics parameter, but the second not selected video analytics parameter is not otherwise used, the second not selected video analytics parameter may be pruned, as may be the first selected video analytics parameter.

An aspect of the specification provides a method comprising: analyzing, at a video analytics engine, images from a camera installed at an installation location, the images analyzed using a full initial machine learning model initially provided for the camera, the full initial machine learning model trained to detect objects in the images using video analytics parameters stored at a memory, the full initial machine learning model being independent of the installation location of the camera; gathering, at the video analytics engine, for a period of time, statistics indicating at least one of: frequency of use of the video analytics parameters of the full initial machine learning model; and error generation frequency in detecting the objects in the images using the video analytics parameters of the full initial machine learning model; after the period of time, based on the statistics, determining, at the video analytics engine, that one or more of the video analytics parameters meets one or more pruning conditions; and in response to the one or more of the video analytics parameters meeting the one or more pruning conditions, pruning, at the video analytics engine, the one or more of the video analytics parameters, such that the full initial machine learning model, initially provided for the camera, changes to an updated machine learning model for the camera.

Another aspect of the specification provides a device comprising: a controller configured to: analyze images from a camera installed at an installation location, the images analyzed using a full initial machine learning model initially provided for the camera, the full initial machine learning model trained to detect objects in the images using video analytics parameters stored at a memory, the full initial machine learning model being independent of the installation location of the camera; gather, for a period of time, statistics indicating at least one of: frequency of use of the video analytics parameters of the full initial machine learning model; and error generation frequency in detecting the objects in the images using the video analytics parameters of the full initial machine learning model; after the period of time, based on the statistics, determine that one or more of the video analytics parameters meets one or more pruning conditions; and in response to the one or more of the video analytics parameters meeting the one or more pruning conditions, prune the one or more of the video analytics parameters, such that the full initial machine learning model, initially provided for the camera, changes to an updated machine learning model for the camera.

Each of the above-mentioned aspects will be discussed in more detail below, starting with example system and device architectures of the system in which the embodiments may be practiced, followed by an illustration of processing blocks for achieving an improved technical method, device, and system for pruning video analytics parameters.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for pruning video analytics parameters. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

Herein, reference will be made to engines, such as video analytics engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

The system 100 comprises a video analytics engine 102 in communication with, and/or associated with, a camera 104, a computing (and/or communication) device 106, a display screen 108 (e.g. and/or another notification device), and an input component 110. The display screen 108 and/or the input component 110 may be incorporated with the computing device 106 and/or the video analytics engine 102. Similarly, the video analytics engine 102 may be combined, and/or partially combined, with the computing device 106.

The video analytics engine 102 may be incorporated with the camera 104 (e.g., in a system-on-chip architecture), and/or (as depicted) co-located with the camera 104 (e.g., as a separate device and/or appliance); in other examples, the video analytics engine 102 may be physically separated from the camera 104 and/or remote from the camera 104. In some examples, the video analytics engine 102 may be hosted at the computing device 106 and/or a cloud computing device and/or more than one cloud computing device (e.g., the functionally of the video analytics engine 102 may be distributed between more than one cloud computing device and the like and/or more than one appliance).

The camera 104 generally acquires images 112 in a field-of-view thereof, for example at an installation location 114 at which the camera 104 is located. As depicted, the installation location 114 comprises an indoor location, such as a hallway and the like of a building at which, as depicted, a human and a dog are located. The camera 104 may comprise a digital and/or electronic camera, including, but not limited to, a video camera. As such, the camera 104 acquires the images 112 and provides the images 112 to the video analytics engine 102, for example in a stream of the images 112, and which may comprise a video stream of the images 112 acquired at a video processing rate of the camera 104.

The camera 104 is understood to be in a fixed location at the installation location 114, for example mounted to a wall, a ceiling and/or pole, and the like, and may have a fixed field-of-view, or may be configured to pan, tilt, zoom (e.g. PTZ functionality) and the like at the installation location 114. Regardless, the camera 104 is understood to be imaging a same view and/or a same plurality of views at the installation location 114. However, the camera 104 may be mounted in any suitable manner and/or in any suitable location.

As will be explained in further detail below, the video analytics engine 102 is understood to receive the images 112 from the camera 104 and perform any suitable video analytics on the images 112 for example to perform security functionality, and the like.

In particular, as depicted, the video analytics engine 102 is initially provided with a full initial machine learning model 116 trained to detect objects in images 112 using video analytics parameters 118-1, 118-2, 118-3 . . . 118-N. The video analytics parameters 118-1, 118-2, 118-3 . . . 118-N are interchangeably referred hereafter, collectively, as the video analytics parameters 118 and, generically, as a video analytics parameter 118. While a number "N" of video analytics parameters 118 are depicted, any suitable number of video analytics parameters 118 are within the scope of the present specification; for example, the number "N" of video analytics parameters 118 may be in the tens, hundreds or thousands, or higher.

For example, the video analytics engine 102 is generally used to analyze the images 112 using the full initial machine learning model 116 and the video analytics parameters 118 to perform, one or more of object recognition, object tracking, and the like, and may further define alert sensitivities, which may include conditions under which alerts are generated (e.g. which may be provided at the display screen 108 and/or via the computing device 106). The video analytics parameters 118 may include machine learning classifiers, convolutional neural network layers and/or convolutional neural network object detectors, and the like, and hence the full initial machine learning model 116 may comprise any suitable machine learning algorithm for identifying objects in the images 112 using the video analytics parameters 118. In one particular example, the full initial machine learning model 116 comprises a convolutional neural network, and the video analytics parameters 118 comprises neurons of the convolutional neural network.

Hence, in particular examples, the video analytics parameters 118 may comprise machine learning classifiers, and the like, used to search for given object types in the images 112, however the video analytics parameters 118 may further comprise given alert sensitives. Similarly, the video analytics parameters 118 may further comprise parameters for tracking objects in the images 112 from the camera 104, for example (as depicted) as a human and/or a dog, and the like (e.g. an indoor autonomous vehicle), moves in the field-of-view of the camera 104 at the installation location 114. Similarly, the video analytics parameters 118 may include geofencing parameters, and the like, to determine when a human, and the like, is in a given region of a field-of-view of the camera 104 and/or the installation location 114. However, any suitable video analytics parameter is within the scope of the present specification including, but not limited to, time-based parameters (e.g. alerts to be generated when given objects are detected in given time ranges, such as in predefined nighttime hours, and the like; as such, time-based parameters may comprise a type of alert sensitivity).

However, machine learning classifiers, alert sensitivities, time-based parameters, geofencing parameters, and the like, are understood to represent only a few examples of video analytics parameters 118 provided herein. For example, video analytics parameters 118 provided herein may include one or more of convolutional neural network (CNN) parameters (e.g. CNN layers, for example when the video analytics engine 102 includes a CNN), machine learning classifiers, object recognition confidence thresholds, time-based parameters, object-type parameters, and size-based object parameters, and the like.

In a particular example, the video analytics engine 102 may be used to perform object recognition using any suitable technique, and assign a confidence score when determining whether, or not an object in an image 112 comprises a given object. Such a confidence score may be compared to an object recognition confidence threshold to determine whether, or not, the object in an image 112 comprises the given object. In one particular example, the camera 104 may be monitoring an indoor location where vehicles are not "normally" located; as such, an object recognition confidence threshold for detecting a vehicle at such an indoor location may be set relatively high for detecting a vehicle, but relatively low for detecting humans.

Furthermore, time-based parameters, object-type parameters, and size-based object parameters may be used to determine whether certain criteria are met, or not, in determining whether, or not, to generate an alert, for example at the display screen 108, and the like. For example, time-based parameters may include the aforementioned alert sensitivities.

Size-based parameters may include sizes for given objects, for example, to determine whether a detected vehicle is of a size associated with vehicles. In a particular example, when a detected vehicle is not of a size associated with vehicles, such as smaller than such a size, the detected vehicle may be assigned a low confidence score, which may be used to determine that criteria for detecting a vehicle have not been met. In a particular example, an animal, such as a dog, may be detected, but classified as a vehicle, and the size of the detected "vehicle" may be on the order of a size of the dog indicating that the detected vehicle is "too small" to be a vehicle; hence, the detected "vehicle" may be assigned a low confidence score which may be used to determine that criteria for detecting a vehicle have not been met. Such low confidence scores may also be determined to be errors for an associated video analytics parameter 118 used to detect vehicles.

Object-type parameters may include any suitable parameters for detecting given objects, such as the aforementioned machine learning classifiers and/or CNN parameters and/or layers, and the like. Furthermore, such object-type parameters may include biometric data including, but not limited to, feature vectors, facial landmarks, gait data, and the like, for detecting humans, animals, and the like.

Hence, the video analytics parameters 118 may comprise default "out of the box" video analytics parameters 118 that are initially installed at video analytics engines that receive images from cameras and such video analytics parameters 118 are understood to not be specific to a given installation location. Hence the video analytics parameters 118 may be used to recognize and/or classify objects (e.g. object classification), and/or perform other related tasks as described herein, represented by the video analytics parameters 118.

As such, the full initial machine learning model 116 and/or the video analytics parameters 118 are understood to be independent of the installation location 114 of the camera 104: hence, while the installation location 114 may be indoors, the video analytics parameters 118 may be for detecting objects that may be located indoors and/or outdoors. In some examples, a video analytics parameter 118 may be for detecting humans, who may generally be located indoors or outdoors, while another video analytics parameter 118 may be for detecting vehicles which may be generally located outdoors, but not indoors. In other examples, a video analytics parameter 118 may be for detecting humans under fluorescent lights, a condition which may generally occur only in indoor locations, and another video analytics parameter 118 may be for detecting humans in the rain and/or fog, a condition which may generally occur only in outdoor locations. Hence, as the installation location 114 is indoors, and as at least a portion of the video analytics parameters 118 may be for outdoor locations, the video analytics engine 102 may rarely, if ever, detect an associated object using the portion of the video analytics parameters 118 that are for outdoor locations. Nonetheless, the video analytics engine 102 generally analyzes the images 112 using the video analytics parameters 118 to search for associated objects, regardless of whether the video analytics parameters 118 are for indoor or outdoor locations, which may waste processing power at the video analytics engine 102.

While not depicted, the video analytics parameters 118 may further be organized into different classes; for example, a first subset of the video analytics parameters 118 may be classified (e.g. via associated stored class identifiers) as a first type of video analytics parameters, such as outdoor video analytics parameters, and a second subset of the video analytics parameters 118 may be classified as a second type of video analytics parameters, indoor video analytics parameters. However, any suitable types and/or classifications of video analytics parameters are within the scope of the present specification.

Furthermore, as previously mentioned, a portion of the video analytics parameters 118 may consistently lead to errors in detecting objects in the images 112, for example false positives, and the like. For example, a video analytics parameter 118 may be to detect a vehicle, but animals, such as dogs, may be detected using such a video analytics parameter 118 and falsely classified as a vehicle by the video analytics engine 102 in error (e.g. a false positive). Such an error may be identified using any suitable technique.

For example, as depicted, the video analytics engine 102 is receiving feedback 120, which may comprise machine learning feedback provided by a user of the video analytics engine 102 via the input component 110, to indicate that an object has been incorrectly identified in an image 112. Continuing with the example above, a dog in an image 112 may have been identified as a vehicle, and the feedback 120 may indicate that the dog was incorrectly identified.

Such a feedback-based technique may be referred to as "teach by example" and hence the feedback 120 may alternatively be referred to as teach-by-example (TBE) feedback 120.

Furthermore, while the feedback 120 has been referred to as being manually generated by users, in other examples, TBE feedback engines may be used to provide the feedback 120, with such TBE feedback engines being local or remote from the video analytics engine 102 and/or the computing device 106 (e.g. with such TBE feedback engines being specifically configured to analyze images and provide the TBE feedback 120). Such TBE feedback engines may include, but is not limited to, a video analytics engine and/or TBE feedback engine operating at one or more cloud devices that "teach" video analytics engine 102 via the feedback 120; TBE feedback engines may include machine learning engines and/or artificial intelligence based engines in the cloud which may have more processing resources available to "learn" than the video analytics engine 102. Hence, for example, the images 112 from the camera 104 may be provided to such a TBE feedback engine, along with output from the respective video analytics engine 102, which may generate respective feedback 120 and provide the respective feedback to the video analytics engine 102.

In particular, in TBE feedback techniques, when a video analytics engine 102 and the like, makes an error (e.g. identifies a dog as a vehicle), TBE feedback 120 may explicitly indicate that an error has occurred. Based on a number of errors, a video analytics engine 102 may modify logic used to make such decisions to avoid similar errors in the future, as described in more detail below. The TBE feedback 120 (indicating an error) may come from a user, and/or or TBE feedback 120 may come from a sophisticated algorithm at the afore mentioned TBE feedback engines; such a sophisticated algorithm may be too complex to run in real-time, but may be used to provide the TBE feedback 120 using alerts generated by the video analytics engine 102 and/or using the images 112 and/or video acquired by the camera 104, and the like.

Hence, as will be described in more detail below, the video analytics engine 102 generally gathers, for a period of time, statistics indicating at least one of: frequency of use of the video analytics parameters 118 of the full initial machine learning model 116; and error generation frequency in detecting the objects in the images 112 using the video analytics parameters 118 of the full initial machine learning model 116. The period of time for which statistics are gathered may be determined heuristically, and may be one hour, one day, one week, one month, and/or any suitable time period. Furthermore, the statistics may include, a number of times and/or a rate and/or frequency that a video analytics parameter 118 was used to detect an object (e.g. with or without an error) and/or a number of errors and/or a frequency of errors that resulted when a video analytics parameter 118 was used to detect an object.

After the period of time, the video analytics engine 102 may, based on the statistics, determine whether one or more of the video analytics parameters 118 meets one or more pruning conditions 122 which may be predetermined and/or preconfigured at the video analytics engine 102. For example, such pruning conditions 122 may include, but are not limited to, a respective frequency of use of a video analytics parameter 118 being below a threshold frequency of use; and/or such pruning conditions 122 may include, but are not limited to, a number of errors generated by a video analytics parameter 118 being above a threshold number of errors. Video analytics parameters 118 that meet one or more of the pruning conditions 122 may be pruned by the video analytics engine 102 such that the video analytics engine 102 no longer processes such video analytics parameters 118 when analyzing the images 112. As such, the full initial machine learning model 116, initially provided for the camera 104, may be changed to an updated machine learning model for the camera 104.

In some examples, pruning of video analytics parameters 118 may include, but is not limited to, deleting video analytics parameters 118 from a memory of the video analytics engine 102. In other examples, pruning of video analytics parameters 118 may include, but is not limited to, disassociating video analytics parameters 118 with the video analytics engine 102, for example, by at least temporarily storing such video analytics parameters 118 at a memory of the video analytics engine 102, though at a location where they are not processed by the video analytics engine 102; in the event of a rollback of the pruning, an association between such video analytics parameters 118 and the video analytics engine 102 may be restored (and/or deleted video analytics parameters 118 may be undeleted using any suitable process).

However, a subset of the video analytics parameters 118 may comprise protected video analytics parameters which are not pruned regardless of meeting the one or more pruning conditions 122. For example, certain objects, such as weapons, may rarely or never be detected in the images 112, but the video analytics engine 102 may be understood to search for such objects. Hence, the video analytics parameters 118 for such objects may be protected such that they are not pruned and/or never pruned. For example, some objects, such as weapons, may be infrequently detected, but it may nonetheless be important that the video analytics engine 102 detect such objects when present in the images 112. Hence, video analytics parameters 118 that correspond to weapons, and/or any other suitable object, may comprise protected video analytics parameters.

Figure 2:
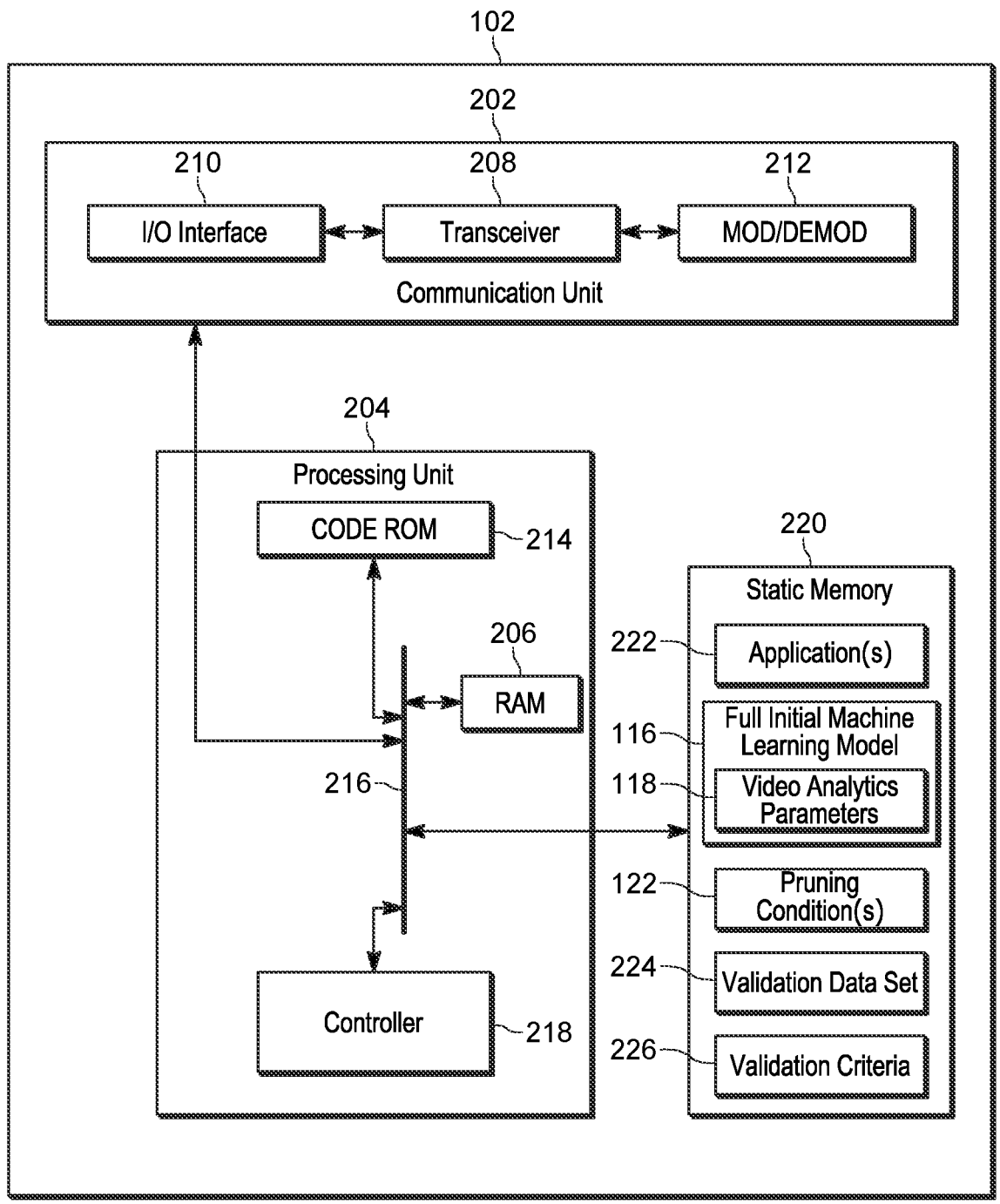
FIG. 2 is a device diagram showing a device structure of a device for pruning video analytics parameters, in accordance with some examples.

Attention is next directed to FIG. 2 which depicts a schematic block diagram of an example of the video analytics engine 102. While the video analytics engine 102 is depicted in FIG. 2 as a single component, functionality of the video analytics engine 102 may be distributed among a plurality of components and the like.

As depicted, the video analytics engine 102 comprises: a communication unit 202, a processing unit 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the video analytics engine 102 may have any suitable structure and/or configuration.

While not depicted, the video analytics engine 102 may include one or more of an input component and a display screen (and/or any other suitable notification device) and the like, such as the input component 110 and/or the display screen 108, and the like.

As shown in FIG. 2, the video analytics engine 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the video analytics engine 102 is not a generic controller and/or a generic device, but a device specifically configured to implement functionality for pruning video analytics parameters, in addition to object detection functionality described herein. For example, in some examples, the video analytics engine 102 and/or the controller 218 specifically comprises a computer executable engine configured to implement functionality for pruning video analytics parameters, in addition to object detection functionality described herein.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the video analytics engine 102 as described herein are maintained, persistently, at the memory 220 and used by the controller 218, which makes appropriate utilization of volatile storage during the execution of such programming instructions.

Figure 3:
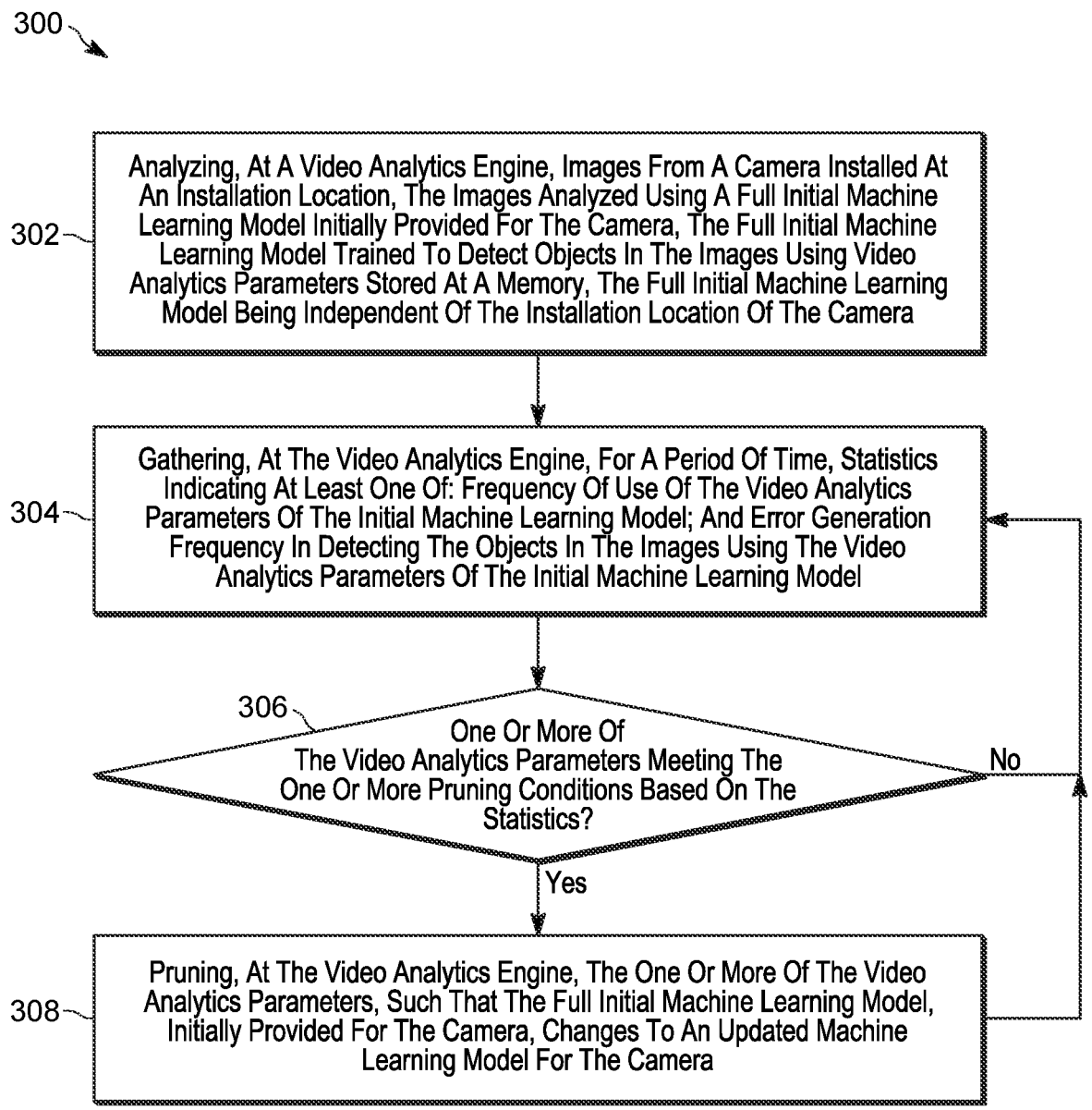
FIG. 3 is a flowchart of a method for pruning video analytics parameters, in accordance with some examples.

In particular, the memory 220 stores instructions corresponding to the at least one application 222 that, when executed by the controller 218, enables the controller 218 to implement functionality for pruning video analytics parameters, including but not limited to, the blocks of the method set forth in FIG. 3.

As depicted, the memory 220 further stores the full initial machine learning model 116, the video analytics parameters 118 and the pruning conditions 122. While the video analytics parameters 118 are stored as components of the full initial machine learning model 116, the video analytics parameters 118 may be stored separately from (e.g. but associated with) the full initial machine learning model 116. Similarly, one or more of the full initial machine learning model 116, the video analytics parameters 118 and the pruning conditions 122 may be stored as components of the application 222 and/or (as depicted) separately from the application 222.

As depicted, the memory 220 further stores a validation data set 224 and validation criteria 226. The validation data set 224 may comprise a set of images, and a machine learning model (e.g., such as the full initial machine learning model 116 and/or an updated machine learning model) may be applied to the validation data set 224 to detect objects, etc. therein, using the video analytics parameters 118 (and/or video analytics parameters 118 that are not pruned). The validation criteria 226 may comprise a list of expected objects that are to be detected in the images of the validation data set 224 by a machine learning model and/or expected alerts, and the like, that are to occur when a machine learning model is applied to the images of the validation data set 224.

Hence, in a simple example, the validation data set 224 may comprise images of given objects that should be detectable in the images 112, such as a human and/or humans of different types and/or weapons, and the like, and the validation criteria 226 may comprise a list of such given objects and/or alerts that are to be generated when such given objects in the images of the validation data set 224 is detected. Pruning is considered successful when the output of a pruned machine learning model applied to the validation data set 224 results in the validation criteria 226.

Hence, when video analytics parameters 118 are pruned, an updated machine learning model may be applied to the validation data set 224 and results may be compared against the validation criteria 226 to determine whether pruning was successful or not. When pruning was not successful (e.g. an object intended to be detected in images of the validation data set 224 was not detected), the pruning may be rolled back, for example, by "undeleting" deleted video analytics parameters 118, and the like.

In illustrated examples, when the controller 218 executes the one or more applications 222, the controller 218 is enabled to: analyze images from a camera installed at an installation location, the images analyzed using a full initial machine learning model initially provided for the camera, the full initial machine learning model trained to detect objects in the images using video analytics parameters stored at a memory, the full initial machine learning model being independent of the installation location of the camera;

gather, for a period of time, statistics indicating at least one of: frequency of use of the video analytics parameters of the full initial machine learning model; and error generation frequency in detecting the objects in the images using the video analytics parameters of the full initial machine learning model; after the period of time, based on the statistics, determining that one or more of the video analytics parameters meets one or more pruning conditions; and in response to the one or more of the video analytics parameters meeting the one or more pruning conditions, pruning the one or more of the video analytics parameters such that the full initial machine learning model, initially provided for the camera, changes to an updated machine learning model for the camera.

The application 222 may include programmatic algorithms, and the like, to implement functionality as described herein.

Alternatively, and/or in addition to programmatic algorithms, the application 222 may include one or more machine learning algorithms to implement functionality as described herein. The one or more machine learning algorithms of the application 222 may include, but are not limited to one or more of a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

While the components of the computing device 106 are not depicted, it is understood that components of the computing device 106 may be similar to the components of the video analytics engine 102, but adapted for respective functionality thereof which may include, but is not limited to alert generation, and the like, for example when an object detected in the images 112 meets predefined criteria for generating an alert.

Attention is now directed to FIG. 3 which depicts a flowchart representative of a method 300 for pruning video analytics parameters. The operations of the method 300 of FIG. 3 correspond to machine readable instructions that are executed by the video analytics engine 102, and specifically the controller 218 of the video analytics engine 102. In the illustrated example, the instructions represented by the blocks of FIG. 3 are stored at the memory 220 for example, as the application 222. The method 300 of FIG. 3 is one way in which the controller 218 and/or the video analytics engine 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218 and/or the video analytics engine 102, analyzes the images 112 from the camera 104 installed at the installation location 114, the images 112 analyzed using the full initial machine learning model 116 initially provided for the camera 104, the full initial machine learning model 116 trained to detect objects in the images 112 using the video analytics parameters 118 stored at the memory 220, the full initial machine learning model 116 being independent of the installation location 114 of the camera 104. In general, as has already been described, the full initial machine learning model 116 may use the video analytics parameters 118 to perform, one or more of object recognition, object tracking, and the like, and may further define alert sensitivities, which may include conditions under which alerts are generated, among other possibilities (e.g. detect events, detect anomalies, recognize people, classify a view, and the like); hence, it is understood the full initial machine learning model 116 may be trained to implement any suitable functionality.

Hence, at the block 302, the controller 218 and/or the video analytics engine 102 may detect and/or track objects in the images 112, and/or perform any other suitable functionality, according to the video analytics parameters 118. Such detecting of objects may include using all of the video analytics parameters 118 to attempt to detect objects in the images 112.

At a block 304, the controller 218 and/or the video analytics engine 102, gathers, for a period of time, statistics indicating at least one of: frequency of use of the video analytics parameters 118 of the full initial machine learning model 116; and error generation frequency in detecting the objects in the images 112 using the video analytics parameters 118 of the full initial machine learning model 116.

Hence, for example, the controller 218 and/or the video analytics engine 102 may determine a number of times (e.g. within the period of time) a video analytics parameters 118 is used to detect a corresponding object and/or generate an alert, and the like, and/or the controller 218 and/or the video analytics engine 102 may determine a number of times (e.g. within the period of time) a video analytics parameters 118 (e.g. used to detect an object and/or generate an alert, and the like) resulted in an error, for example as indicted by the feedback 120.

Hence, the method 300 may further include, but is not limited to, the controller 218 and/or the video analytics engine 102 receiving TBE feedback (e.g. the feedback 120) to indicate that a given video analytics parameter 118 has generated an error at the video analytics engine 102, the TBE feedback used to populate the statistics related to the error generation frequency.

Furthermore, the period of time for which statistics are gathered may be determined heuristically and/or predetermined and may comprise one day, one week, one month and/or any other suitable time period. Furthermore, the period of time may vary and/or depend on the statistics. For example, the controller 218 and/or the video analytics engine 102 may gather the statistics until one or more video analytics parameters 118 has a given frequency of use (e.g. a threshold frequency of use of a pruning condition 122 and/or a multiple of such a threshold frequency) and/or until one or more video analytics parameters 118 results in a given number of errors (e.g. such as the threshold number of errors of a pruning condition 122), and/or until a given period of time is reached and/or until a given number of observations/object detections of any type occur, and/or until a given number of observations/object detections of a specific type occur (e.g. a given number of vehicles). Alternatively, the controller 218 and/or the video analytics engine 102 may gather the statistics until a given number of statistics are gathered (e.g. a total given number of uses and/or a total given number of errors). Hence, the period of time for which statistics are gathered may depend on a frequency of use and/or an error rate of the video analytics parameters 118, and/or other factors, and/or the period of time for which statistics are gathered may be for a fixed given period of time.

After the period of time, at a block 306, the controller 218 and/or the video analytics engine 102 determines, based on the statistics gathered at the block 304, whether one or more of the video analytics parameters 118 meets one or more pruning conditions 122.

As previously mentioned, the one or more pruning conditions 122 may comprise a respective frequency of use of a video analytics parameter 118 being below a threshold frequency of use. Similarly, the one or more pruning conditions 122 may comprise a number of errors generated by a video analytics parameter 118 being above a threshold number of errors. The threshold frequency of use and/or the threshold number of errors may be heuristically determined and/or predetermined and stored with the one or more pruning conditions 122. The threshold frequency of use may be provided as a rate of use and/or a given number of uses for the given time period, such as one time, ten times, twenty times, in the given time period, and/or any other suitable value. Similarly, threshold number of errors may be provided as a rate of errors and/or a given number of errors for the given time period, such as one error, five errors, ten errors, in the given time period, and/or any other suitable number.

Hence, at the block 306, the controller 218 and/or the video analytics engine 102 may determine whether one or more video analytics parameters 118 has a frequency of use that is below a threshold frequency of use, and/or at the block 306, the controller 218 and/or the video analytics engine 102 may determine whether one or more video analytics parameters 118 has generated a number of errors above a threshold number of errors. In examples where a video analytics parameter 118 has a frequency of use that is above a threshold frequency of use (e.g. such that one pruning condition 122 is not met) but has generated a number of errors above a threshold number of errors (e.g. such that another pruning condition 122 is met), the video analytics parameter 118 is understood to meet one or more pruning conditions 122 at the block 306.

In response to the one or more of the video analytics parameters 118 meeting one or more of the pruning conditions 122 (e.g. a "YES" decision at the block 306), at a block 308, the controller 218 and/or the video analytics engine 102 prunes the one or more of the video analytics parameters 118 such that the full initial machine learning model 116, initially provided for the camera 104, changes to an updated machine learning model for the camera 104.

For example, the video analytics parameters 118 that meet one or more of the pruning conditions 122 may be deleted from the memory 220. Alternatively, the video analytics parameters 118 that meet one or more of the pruning conditions 122 may continue to be stored at the memory 220, at least for a given time period, but stored in a manner such that the updated machine learning model does not use such video analytics parameters 118 to detect corresponding objects in the images 112; for example, such video analytics parameters 118 may be stored at the memory 220, but not associated with the updated machine learning model.

In yet another alternative, the full initial machine learning model 116 may be backed up (e.g. stored, and/or continued to be stored, at the memory 220) and replaced with the updated machine learning model. Put another way, the updated machine learning model may be generated as a copy of the full initial machine learning model 116 but without the video analytics parameters 118 that meet one or more of the pruning conditions 122, and the controller 218 and/or the video analytics engine 102 may use the updated machine learning model in place of the full initial machine learning model 116. Storing, and/or continuing to store, the full initial machine learning model 116 may assist with rollback, as described below.

Regardless, an updated machine learning model results. In some examples, the updated machine learning model may be similar to the full initial machine learning model 116 but with fewer video analytics parameters 118 associated therewith. In particular, the updated machine learning model is configured to one or more of detect only a subset of the objects detected by the full initial machine learning model 116; detect the objects, detected by the full initial machine learning model 116, but only under a subset of conditions for which the full initial machine learning model 116 detects the objects; and detect only a subset of features detected by the full initial machine learning model 116. Put another way, the updated machine learning model may be configured to perform a subset of the functionality of the full initial machine learning model 116 including, but not limited to, a subset of object tracking and/or alerts and/or alert sensitivities and/or event detection and/or anomaly detection and/or people detection and/or view classification, and the like. Hence, in a particular example, for the images 112 from the camera 104 at the indoor installation location 114, vehicles may not be detected by the updated machine learning model due to pruning of video analytics parameters 118 that correspond to vehicles. Similarly, for the images 112 from the camera 104 at the indoor installation location 114, humans in the rain may not be detected by the updated machine learning model due to pruning of video analytics parameters 118 that correspond to humans in the rain. Hence, the video analytics engine 102 generally operates more efficiently with the updated machine learning model as fewer video analytics parameters 118 are used to analyze images as compared to the full initial machine learning model 116.

In some examples, the method 300 may further comprise, prior to pruning the video analytics parameters 118 that meet one or more of the pruning conditions 122, the controller 218 and/or the video analytics engine 102: requesting confirmation of the pruning via the input component 110; in response to receiving the confirmation, pruning the one or more of the video analytics parameters 118; and, otherwise not pruning the one or more of the video analytics parameters 118. Hence, for example, the controller 218 and/or the video analytics engine 102 may, in response to the video analytics parameters 118 meeting one or more of the pruning conditions 122, provide a notification at the display screen 108 (and/or any other suitable notification device), that the video analytics parameters 118 that meet one or more of the pruning conditions 122 are to be pruned. Such a notification may be provided with electronic buttons, and the like, to confirm or reject such pruning, which may be selected via the input component 110. Presuming such pruning is confirmed, and hence confirmation of the pruning is received via the input component 110 used to select a corresponding electronic button, the pruning at the block 308 may occur. Otherwise pruning may not occur (e.g. the pruning is rejected).

Furthermore, in such pruning, protected video analytics parameters 118 are not pruned regardless of whether or not they meet the one or more pruning conditions 122.

Otherwise, in response to the one or more of the video analytics parameters 118 not meeting the one or more pruning conditions 122 (e.g. a "NO" decision at the block 306), the controller 218 and/or the video analytics engine 102 continue to gather statistics for the video analytics parameters 118 at the block 304, for example for another period of time and the controller 218 and/or the video analytics engine 102 may repeat the block 306, and the block 308.

Alternatively, the pruning, or not pruning, of the video analytics parameters 118 may be a one-time event for which statistics are determined for one period of time, and the method 300 may end after the block 308 and/or after a "NO" decision at the block 306.

Yet further features are within the scope of the present specification.

For example, as mentioned above, the validation data set 224 may be used to validate an updated machine learning model with, or without, the validation criteria 226.

In some of these examples, the method 300 may further comprise the controller 218 and/or the video analytics engine 102, after pruning the one or more of the video analytics parameters 118: using remaining video analytics parameters 118 (e.g. not pruned video analytics parameters 118), applying the updated machine learning model to the validation data set 224; providing results of applying the updated machine learning model to the validation data set 224 at a notification device (e.g. the display screen 108); and in response to receiving a rollback command, received in response to providing the results to the notification device, reversing the pruning of the one or more of the video analytics parameters 118. As previously described, at least of a portion of applying the updated machine learning model to the validation data set 224 may occur at a server and/or a cloud computing device.

Hence, for example, the results of applying the updated machine learning model to the validation data set 224 may be provided at the display screen 108, and an operator of the input component 110 may review the results and operate the input component 110 to confirm or reject the pruning. For example, the results of applying the updated machine learning model to the validation data set 224 may indicate that only certain objects were detected; the operator of the input component 110 may review the results and determine that an expected object, such as a weapon, was not detected, and reject the pruning by operating the input component 110; such operation may result in a rollback command being received at the controller 218 and/or the video analytics engine 102. Receipt of such a rollback command may result in deleted and/or unassociated video analytics parameters 118 being undeleted and/or reassociated with the updated machine learning model, such that changes to the full initial machine learning model 116 that resulted in the updated machine learning model are reversed and the full initial machine learning model 116 is restored at the video analytics engine 102. Such a reversal of changes may be referred to as a rollback. However, when the pruning is confirmed, the video analytics parameters 118 which were pruned may be permanently deleted, to free up space at the memory 220.

Alternatively, the method 300 may further comprise the controller 218 and/or the video analytics engine 102, after pruning the one or more of the video analytics parameters 118: using remaining video analytics parameters 118 (e.g. not pruned video analytics parameters 118), applying the updated machine learning model to the validation data set 224; and in response to results of applying the updated machine learning model to the validation data set 224 not meeting the validation criteria 226, reversing the pruning of the one or more of the video analytics parameters 118.

Hence, a rollback may also occur when results of applying the updated machine learning model to the validation data set 224 do not meet the validation criteria 226 (e.g. weapons in images of the validation data set 224, which are indicated in the validation criteria 226, are not detected by the updated machine learning model).

However, the method 300 may further comprise the controller 218 and/or the video analytics engine 102, after pruning the one or more of the video analytics parameters 118: in response to receiving a rollback command, for example the input component 110, reversing the pruning of the one or more of the video analytics parameters 118. In these examples, an operator of the input component 110 may decide to rollback any pruning (e.g. for any reason), and operate the input components 110 (e.g. via selection of a menu option, and the like, provided at the display screen 108) to cause a reversal of the pruning and restore the full initial machine learning model 116 at the video analytics engine 102.

Figure 4:
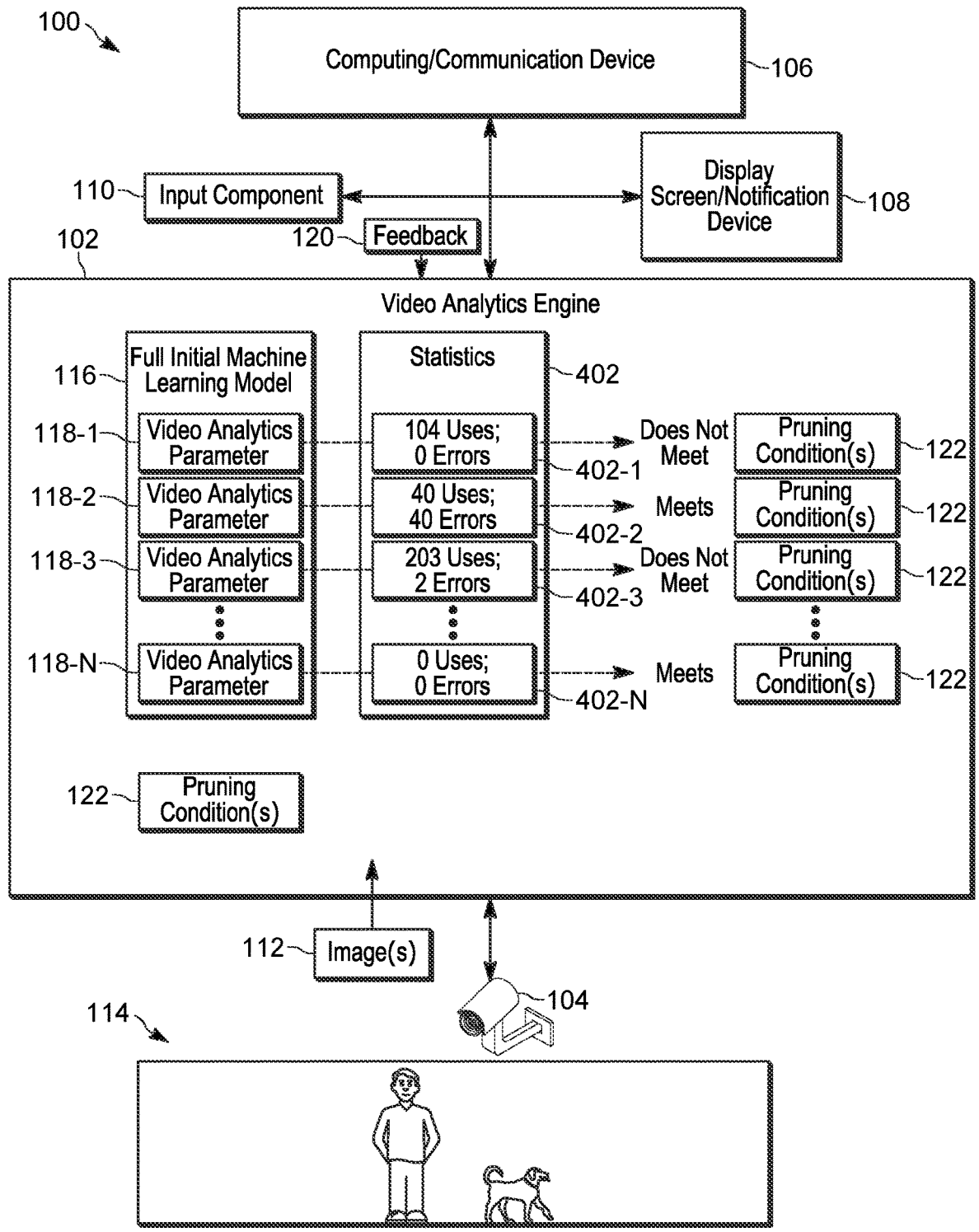
FIG. 4 depicts the system of FIG. 1 implementing a method for pruning video analytics parameters, in accordance with some examples.
Figure 5:
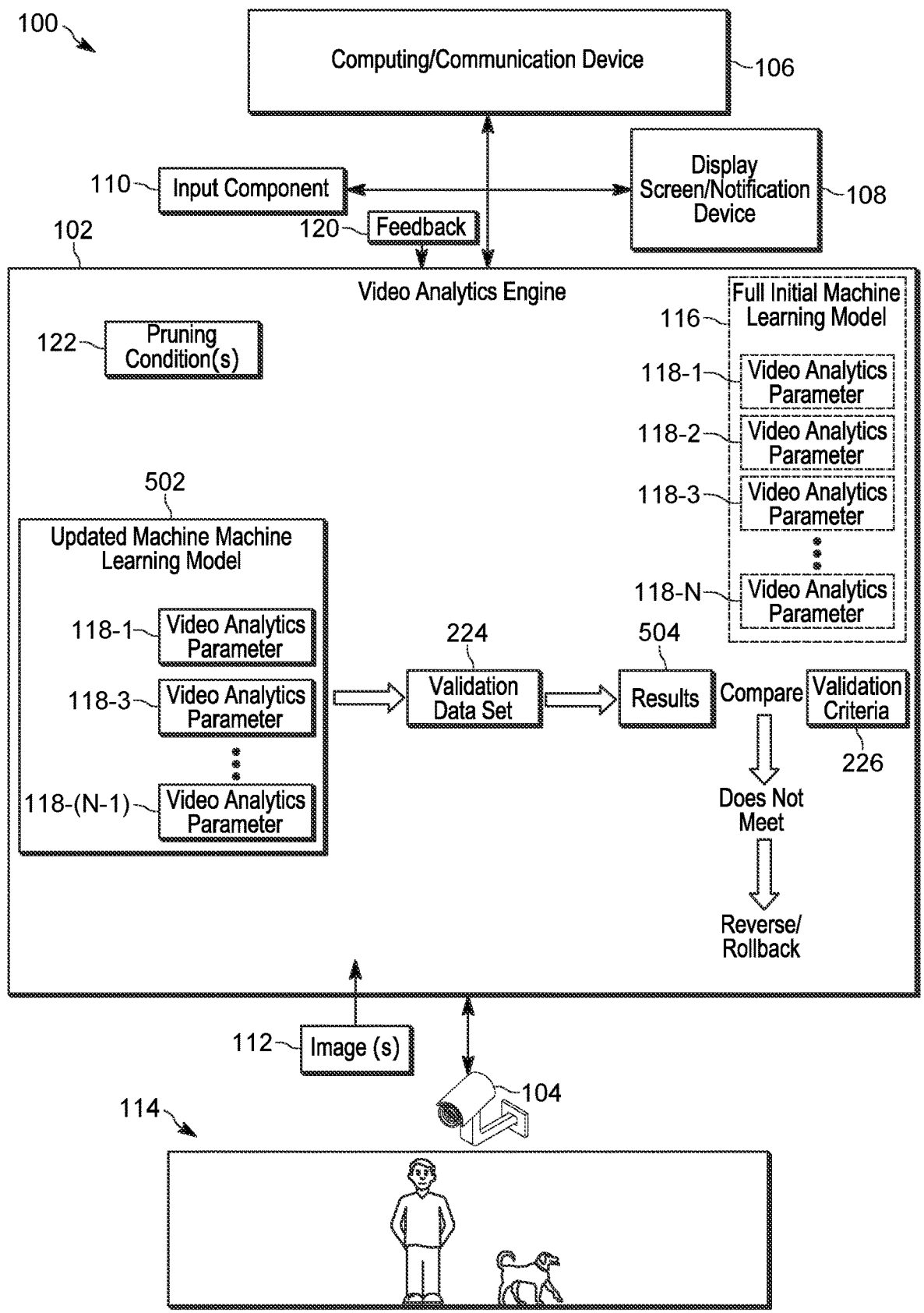
FIG. 5 depicts the system of FIG. 1 continuing to implement a method for pruning video analytics parameters, in accordance with some examples.

Attention is next directed to FIG. 4 and FIG. 5 which depict an example of the method 300; FIG. 4 and FIG. 5 are substantially similar to FIG. 1, with like components having like numbers.

At FIG. 4, the video analytics engine 102 is understood to be analyzing (e.g. at the block 302 of the method 300) the images 112 of the camera 104 using the full initial machine learning model 116. In addition, the video analytics engine 102 is understood to be gathering (e.g. at the block 304 of the method 300) statistics 402 on the video analytics parameters 118 for a period of time. For example, as depicted, statistics 402-1 for the video analytics parameter 118-1 indicate that the video analytics parameter 118-1 has been used 104 times, and resulted in 0 errors. Similarly, as depicted, statistics 402-2 for the video analytics parameter 118-2 indicate that the video analytics parameter 118-2 has been used 40 times, and resulted in 40 errors. Similarly, as depicted, statistics 402-3 for the video analytics parameter 118-3 indicate that the video analytics parameter 118-3 has been used 203 times, and resulted in 2 errors. Similarly, as depicted, statistics 402-N for the video analytics parameter 118-N indicate that the video analytics parameter 118-3N has been used 0 times, and resulted in 0 errors.

As further depicted in FIG. 4, the video analytics engine 102 determines (e.g. at the block 306 of the method 300) whether the respective statistics 402 for the video analytics parameters 118 meet one or more of the pruning conditions 122. In the depicted example, it is understood that a threshold frequency of use of a video analytics parameter 118 may be 20 uses within the period of time for which the statistics 402 are collected, and a threshold number of errors may be 10 errors within the period of time for which the statistics 402 are collected. Hence, in this example, when a number of uses of a video analytics parameter 118 is less than "20" one or more of the pruning conditions 122 is met; and/or when a number of errors generated by a video analytics parameter 118 is greater than "10" one or more of the pruning conditions 122 is met. Furthermore, it is understood that a video analytics parameter 118 may meet only one pruning condition 122 to be pruned.

For example, as depicted, the statistics 402-2 indicate that, for the video analytics parameter 118-2 the 40 number of errors for the video analytics parameter 118-2 is greater than the threshold number of errors of "10"; as such, the video analytics parameter 118-2 meets one or more of the pruning conditions 122. While the number of uses of "40" of the video analytics parameter 118-2 is not less than the threshold frequency of uses of "20", the video analytics parameters 118-2 still meets one or more of the pruning conditions 122 (e.g. as the 40 number of errors for the video analytics parameter 118-2 is greater than the threshold number of errors of "10").

Similarly, as depicted, the statistics 402-N indicate that, for the video analytics parameter 118-N the 0 number of uses for the video analytics parameter 118-N is less than the threshold frequency of uses of "20"; as such, the video analytics parameters 118-N meets one or more of the pruning conditions 122 (e.g. regardless of the number of errors of 0 not being above the threshold error number of "10").

In contrast, the statistics 402-1 indicate that the video analytics parameter 118-1 does not meet one or more of the pruning conditions 122 as the 0 number of errors for the video analytics parameter 118-1 is less than the threshold number of errors of "10", and the 104 uses of the video analytics parameter 118-1 is greater than the threshold frequency of uses of "20". Similarly, the statistics 402-3 indicate that the video analytics parameter 118-3 does not meet one or more of the pruning conditions 122 as the 2 number of errors for the video analytics parameter 118-3 is less than the threshold number of errors of "10", and the 203 uses of the video analytics parameter 118-1 is greater than the threshold frequency of uses of "20".

With attention next directed to FIG. 5, the video analytics engine 102 has pruned (e.g. at the block 308 of the method 300) the video analytics parameters 118-2, 118-N from the full initial machine learning model 116 to produce an updated machine learning model 502 that is similar to the full initial machine learning model 116 but uses the video analytics parameters 118-1, 118-3 . . . 118-(N−1) to analyze the images 112 (e.g. the video analytics parameters 118-2, 118-N are not processed by the updated machine learning model 502). As depicted, the full initial machine learning model 116 is not deleted from the video analytics engine 102 but may be stored but not used (e.g. as indicated by the full initial machine learning model 116 and associated video analytics parameters 118, including the video analytics parameters 118-2, 118-N, being depicted in dashed lines; while in FIG. 5 two versions of certain video analytics parameters 118 are depicted (e.g. the video analytics parameters 118-1, 118-3), the video analytics parameters 118 depicted in dashed lines are understood be copies of the similarly numbered video analytics parameters 118 depicted in solid lines (or vice versa). Alternatively, the full initial machine learning model 116 may not be stored and/or the pruned video analytics parameters 118-2, 118-N may be stored.

As depicted, the video analytics engine 102 may optionally apply the updated machine learning model 502 to the validation data set 224 to obtain results 504 (e.g. a list of objects detected in images of the validation data set 224) which are compared to the validation criteria 226 (e.g. a list of objects that should be detected in images of the validation data set 224). As depicted, the results 504 do not meet the validation criteria 226 (e.g. an object listed in the validation criteria 226 does not appear in the results 504); as such, the video analytics engine 102 may reverse and/or rollback the pruning by deleting the updated machine learning model 502 restoring the full initial machine learning model 116 depicted in FIG. 4.

Alternatively, rather than restore the full initial machine learning model 116, the video analytics engine 102 may restore and/or add one of the pruned video analytics parameters 118 to the updated machine learning model 502 and again apply the updated machine learning model 502 to the validation data set 224 to obtain results (e.g. the video analytics parameters 118-2 may be restored but not video analytics parameter 118-N) and again determine whether the validation criteria 226 is met. If so, the video analytics engine 102 may continue with the updated machine learning model 502 with the restored video analytics parameters 118; if not, the video analytics engine 102 may restore and/or add another one of the pruned video analytics parameters 118 to the updated machine learning model 502 and again apply the updated machine learning model 502 to the validation data set 224 to obtain results to determine whether the validation criteria 226 is met; such a process may continue until the validation criteria 226 is met. In these examples the pruned video analytics parameters 118 may be obtained from the stored, but not used, full initial machine learning model 116 and/or from stored, pruned, video analytics parameters 118.

Alternatively, when the results 504 do meet the validation criteria 226, full initial machine learning model 116 and/or the video analytics parameters 118-2, 118-N may be permanently deleted.

Yet further features are within the scope of the present specification. For example, attention is next directed to FIG. 6 and FIG. 7 which respectively depict a method 600 and a method 700 that may be implemented by the video analytics engine 102. The operations of the method 600 and/or the method 700 may correspond to machine readable instructions that are executed by the video analytics engine 102, and specifically the controller 218 of the video analytics engine 102. In the illustrated example, the instructions represented by the blocks of the method 600 and/or the method 700 may be stored at the memory 220 for example, as different modules of the application 222. The method 600 and/or the method 700 are other ways in which the controller 218 and/or the video analytics engine 102 and/or the system 100 may be configured. Furthermore, the following discussion of the method 600 and/or the method 700 will lead to yet a further understanding of the system 100, and its various components.

The method 600 and/or the method 700 need not be performed in the exact sequence as shown and likewise various blocks may be performed in parallel rather than in sequence. Accordingly, the elements of the method 600 and/or the method 700 are referred to herein as "blocks" rather than "steps." The method 600 and/or the method 700 may be implemented on variations of the system 100 of FIG. 1, as well.

It is further understood in the following discussion that at least a first subset of the video analytics parameters 118 may be classified (e.g. via associated stored class identifiers) as a first type of video analytics parameters, such as outdoor video analytics parameters. In some examples, a second subset of the video analytics parameters 118 may be classified as a second type of video analytics parameters, indoor video analytics parameters. However, any suitable types and/or classifications of video analytics parameters are within the scope of the present specification.

Figure 6:
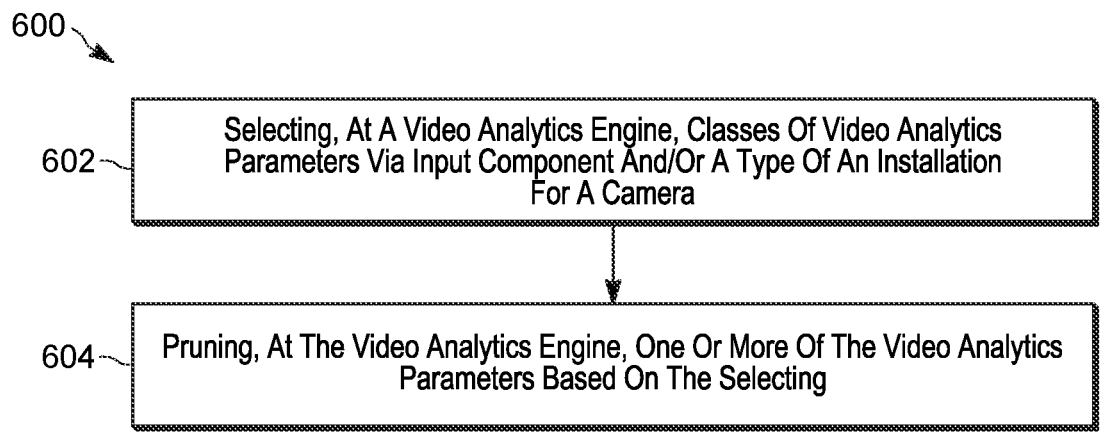
FIG. 6 is a flowchart of another method for pruning video analytics parameters, in accordance with some examples.

With attention first directed to FIG. 6 and the method 600, at a block 602, the controller 218 and/or the video analytics engine 102 selects classes of video analytics parameters 118 via receipt of input via the input component 110 and/or the controller 218 and/or via a type of installation for the camera 104.

Continuing with the example of the installation location 114 being indoors, an operator of the input component 110 may select, using a menu provided at the display screen 108, a class of "indoor" video analytics parameters 118 and/or may select an "indoor" type of the installation location 114, such that "indoor" video analytics parameters 118 are not to be pruned. Alternatively, the controller 218 and/or the video analytics engine 102 may analyze the images 112 to determine whether the installation location 114 is outdoors (e.g. as depicted) or indoors (e.g. a type of installation for the camera 104 may be "indoors" or "outdoor").

Regardless, at a block 604, the controller 218 and/or the video analytics engine 102 prunes the one or more video analytics parameters 118 based on the selecting at the block 604.

For example, when "indoor" classes of video analytics parameters 118 are selected via the input component 110, and/or an installation type is indoors, other video analytics parameters 118 which are not indoor classes and/or not associated with indoor installations are pruned at the block 604, such as outdoor video analytics parameters 118.

Alternatively, at the block 602, classes of video analytics parameters 118 to be pruned may be selected, and/or an installation type for which video analytics parameters 118 are to be pruned may be selected. As such, the method 600 may be implemented based on a determination of video analytics parameters 118 to be pruned and/or the method 600 may be implemented based on a determination of video analytics parameters 118 that are not be pruned.

Figure 7:
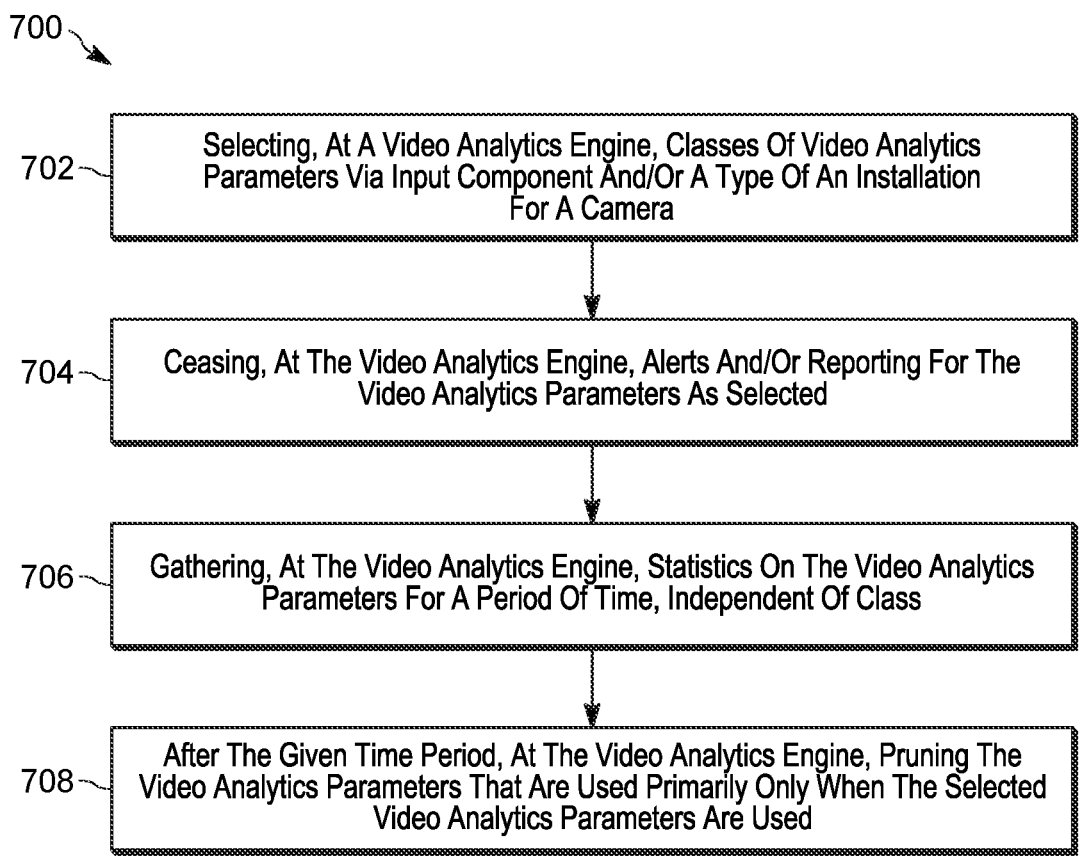
FIG. 7 is a flowchart of yet another method for pruning video analytics parameters, in accordance with some examples.

Attention is next directed to the method 700 of FIG. 7. At a block 702, the controller 218 and/or the video analytics engine 102 selects classes of video analytics parameters 118, for example via the input component and/or a type of installation for the camera 104. It is understood that the classes of video analytics parameters 118 selected may be classes of video analytics parameters 118 which may, eventually as described below, be pruned. Hence, the block 702 is similar to the block 602 of the method 600.

However, at a block 704, the controller 218 and/or the video analytics engine 102 ceases alerts and/or any associated reporting of the video analytics parameters 118 as selected at the block 702. Similar to the method 600, the video analytics parameters 118 for which alerts, and the like, cease may be based on a determination of video analytics parameters 118 which may be pruned and/or based on a determination of video analytics parameters 118 which may not be pruned. Ceasing of alerts may include, but are not limited to, the alerts being generated, but not provided at the display screen 108 and/or via the computing device 106.

At a block 706, the controller 218 and/or the video analytics engine 102 gathers, for a period of time, statistics on the video analytics parameters 118, independent of class, with respect to the video analytics parameters 118 as selected at the block 702. For example, at the block 706, the controller 218 and/or the video analytics engine 102 may determine which video analytics parameters 118 are primarily used only in conjunction with the video analytics parameters 118 as selected at the block 702.

For example, in CNNs, interactions between neurons may be complex. While some neurons may be in a class of "outdoor" neurons and may "fire" when associated objects are detected in images, other neurons may not be in the "outdoor" class but may "fire" only, and/or primarily, when "outdoor" class neurons fire. Hence, in examples where the video analytics parameters 118 comprise neurons of a CNN, at the block 706, the controller 218 and/or the video analytics engine 102 may determine which neurons are primarily used, and/or only used, in conjunction with neurons selected at the block 702.

Hence, for example, a class of "outdoor" video analytics parameters 118 (e.g. "outdoor" neurons) may be selected at the block 702 to be pruned, such as video analytics parameters 118 associated with vehicles. In this example, at the block 706, the controller 218 and/or the video analytics engine 102 determines which other video analytics parameters 118 are used in conjunction with detecting the class of "outdoor" video analytics parameters 118 (e.g. associated with vehicles), but not used with video analytics parameters 118 of other classes and/or not used with the "outdoor" video analytics parameters 118 (e.g. not used with "not" selected video analytics parameters 118).

At the block 708, the controller 218 and/or the video analytics engine 102 prunes the video analytics parameters 118 which are used primarily only when the selected video analytics parameters 118 are used. Hence, for example, at the block 708, the video analytics parameters 118 selected at the block 702 may be pruned as well as those video analytics parameters 118 which are used primarily and/or only when the selected video analytics parameters 118 are used.

Continuing with the example, of outdoor" video analytics parameters 118 selected at the block 702, such as vehicles, the "outdoor" video analytics parameters 118 are pruned at the block 708 as well as other (e.g. not selected) video analytics parameters 118 used only when the "outdoor" video analytics parameters 118 are used.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot prune video analytics parameters).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    analyzing, at a video analytics engine, images from a camera installed at an installation location, the images analyzed using a full initial machine learning model initially provided for the camera, the full initial machine learning model trained to detect objects in the images using video analytics parameters stored at a memory, the full initial machine learning model being independent of the installation location of the camera;
    gathering, at the video analytics engine, for a period of time, statistics indicating: frequency of use of the video analytics parameters of the full initial machine learning model; and error generation frequency in detecting the objects in the images using the video analytics parameters of the full initial machine learning model, the error generation frequency determined from one or more of feedback and confidence scores associated with the objects detected in error by the full initial learning model;
    after the period of time, based on the statistics, determining, at the video analytics engine, that one or more of the video analytics parameters meets one or more pruning conditions;
    in response to the one or more of the video analytics parameters meeting the one or more pruning conditions, pruning, at the video analytics engine, the one or more of the video analytics parameters, such that the full initial machine learning model, initially provided for the camera, changes to an updated machine learning model for the camera, wherein the pruning includes deleting respective video parameters for the objects detected in error, when the error generation frequency for the objects detected in error is above a threshold number of errors; and iteratively repeating the analyzing, the gathering, the determining, and the pruning such that the full initial machine learning model changes to the updated machine learning model that is specific to the camera being used to obtain the images and to the location of the camera.

2. The method of claim 1, wherein a subset of the video analytics parameters comprise protected video analytics parameters which are not pruned regardless of meeting the one or more pruning conditions.

3. The method of claim 1, further comprising:
receiving teach-by-example (TBE) feedback to indicate that a given video analytics parameter has generated an error at the video analytics engine, the TBE feedback used to populate the statistics related to the error generation frequency.

4. The method of claim 1, wherein the one or more pruning conditions comprises:
a respective frequency of use of a video analytics parameter being below a threshold frequency of use.

5. The method of claim 1, wherein the one or more pruning conditions comprises:
a number of errors generated by a video analytics parameter being above the threshold number of errors.

6. The method of claim 1, further comprising, prior to pruning the one or more of the video analytics parameters:
requesting confirmation of the pruning via an input component;
in response to receiving the confirmation, pruning the one or more of the video analytics parameters; and, otherwise
not pruning the one or more of the video analytics parameters.

7. The method of claim 1, further comprising, after pruning the one or more of the video analytics parameters:
in response to receiving a rollback command, reversing the pruning of the one or more of the video analytics parameters.

8. The method of claim 1, further comprising, after pruning the one or more of the video analytics parameters:
using remaining video analytics parameters, applying the updated machine learning model to a validation data set;
providing results of applying the updated machine learning model to the validation data set at a notification device; and
in response to receiving a rollback command, received in response to providing the results the notification device, reversing the pruning of the one or more of the video analytics parameters.

9. The method of claim 1, further comprising, after pruning the one or more of the video analytics parameters:
using remaining video analytics parameters, applying the updated machine learning model to a validation data set; and
in response to results of applying the updated machine learning model to the validation data set not meeting validation criteria, reversing the pruning of the one or more of the video analytics parameters.

10. The method of claim 1, wherein the updated machine learning model is configured to one or more of:

detect only a subset of the objects detected by the full initial machine learning model; and
detect the objects, detected by the full initial machine learning model, but only under a subset of conditions for which the full initial machine learning model detects the objects.

11. A device comprising:
a controller configured to:
analyze images from a camera installed at an installation location, the images analyzed using a full initial machine learning model initially provided for the camera, the full initial machine learning model trained to detect objects in the images using video analytics parameters stored at a memory, the full initial machine learning model being independent of the installation location of the camera;
gather, for a period of time, statistics indicating: frequency of use of the video analytics parameters of the full initial machine learning model; and error generation frequency in detecting the objects in the images using the video analytics parameters of the full initial machine learning model, the error generation frequency determined from one or more of feedback and confidence scores associated with the objects detected in error by the full initial learning model;
after the period of time, based on the statistics, determine that one or more of the video analytics parameters meets one or more pruning conditions;
in response to the one or more of the video analytics parameters meeting the one or more pruning conditions, prune the one or more of the video analytics parameters, such that the full initial machine learning model, initially provided for the camera, changes to an updated machine learning model for the camera, wherein pruning includes deleting respective video parameters for the objects detected in error, when the error generation frequency for the objects detected in error is above a threshold number of errors; and,
iteratively repeat the analyzing, the gathering, the determining, and the pruning such that the full initial machine learning model changes to the updated machine learning model that is specific to the camera being used to obtain the images and to the location of the camera.

12. The device of claim 11, wherein a subset of the video analytics parameters comprise protected video analytics parameters which are not pruned regardless of meeting the one or more pruning conditions.

13. The device of claim 11, wherein the controller is further configured to:
receive teach-by-example (TBE) feedback to indicate that a given video analytics parameter has generated an error at the video analytics engine, the TBE feedback used to populate the statistics related to the error generation frequency.

14. The device of claim 11, wherein the one or more pruning conditions comprises:
a respective frequency of use of a video analytics parameter being below a threshold frequency of use.

15. The device of claim 11, wherein the one or more pruning conditions comprises:
a number of errors generated by a video analytics parameter being above the threshold number of errors.

16. The device of claim 11, wherein the controller is further configured to, prior to pruning the one or more of the video analytics parameters:

request confirmation of the pruning via an input component;
in response to receiving the confirmation, prune the one or more of the video analytics parameters; and, otherwise not prune the one or more of the video analytics parameters.

17. The device of claim 11, wherein the controller is further configured to, after pruning the one or more of the video analytics parameters:
in response to receiving a rollback command, reverse the pruning of the one or more of the video analytics parameters.

18. The device of claim 11, wherein the controller is further configured to, after pruning the one or more of the video analytics parameters:
use remaining video analytics parameters, applying the updated machine learning model to a validation data set;
provide results of applying the updated machine learning model to the validation data set at a notification device; and
in response to receiving a rollback command, received in response to providing the results the notification device, reverse the pruning of the one or more of the video analytics parameters.

19. The device of claim 11, wherein the controller is further configured to, after pruning the one or more of the video analytics parameters:
use remaining video analytics parameters, applying the updated machine learning model to a validation data set; and
in response to results of applying the updated machine learning model to the validation data set not meeting validation criteria, reverse the pruning of the one or more of the video analytics parameters.

20. The device of claim 11, wherein the updated machine learning model is configured to one or more of:
detect only a subset of the objects detected by the full initial machine learning model; and
detect the objects, detected by the full initial machine learning model, but only under a subset of conditions for which the full initial machine learning model detects the objects.

* * * * *